Dec. 27, 1966 C. S. GEHRIE 3,294,206

LUGGAGE

Filed July 28, 1964 5 Sheets-Sheet 1

INVENTOR.
CHARLES S. GEHRIE

BY Harry G. Shapiro

ATTORNEY

Dec. 27, 1966 C. S. GEHRIE 3,294,206

LUGGAGE

Filed July 28, 1964 5 Sheets-Sheet 2

INVENTOR.
CHARLES S. GEHRIE

BY Harry G. Shapiro

ATTORNEY

INVENTOR.
CHARLES S. GEHRIE
BY Harry G. Reapeis
ATTORNEY

Dec. 27, 1966 C. S. GEHRIE 3,294,206

LUGGAGE

Filed July 28, 1964 5 Sheets-Sheet 4

INVENTOR.
CHARLES S. GEHRIE
BY

ATTORNEY

INVENTOR.
CHARLES S. GEHRIE
BY Harry S. Shapiro
ATTORNEY

United States Patent Office 3,294,206
Patented Dec. 27, 1966

3,294,206
LUGGAGE

Charles S. Gehrie, Montclair, N.J., assignor to Presto Lock Co., Inc., Garfield, N.J., a corporation of New York Filed July 28, 1964, Ser. No. 385,661
20 Claims. (Cl. 190—49)

The invention relates to improvements in luggage of the type having a valance and latching or latching and lock devices associated with the valance.

The desirability of making luggage cases wherein the locks are mounted so that they do not protrude from the case has been recognized in the art. When the latching devices or locks project beyond the case proper, they are subject to damage. Luggage cases encounter substantial abuse when thrown about by careless attendants in baggage rooms, etc., and locks with their movable parts are the most likely components of a luggage case to be damaged. Moreover, from the appearance or esthetic view-point, it is desirable that the continuous contour lines of a luggage case be unbroken by the irregularities resulting from the upstanding character of the luggage case's locks.

In order to minimize the foregoing problems, it has been the prior art practice to make luggage cases with valances constructed to provide a peripheral, outwardly open recess or channel and to position the locks within the recess so that they do not project to an undue extent above the vertically arranged side walls of the recess. An example of such valance structure is disclosed in my Patent No. 3,112,018, granted November 26, 1963.

While recessing the locks within a valance as above described has the effect of minimizing the contour irregularities which would otherwise project from the luggage case because of the locks, this is a compromise solution of the problem. To furnish the recess, the valance must be formed with side walls which provide upstanding ribs. Such ribs project above the adjoining shells constituting the main body portions of the case. As a result, the valance itself provides parts which project from the luggage case, though of a continuous and regular character. Also, in the areas where the locks are not located, that is, along the sides of the luggage case, and on the top of the luggage case at the areas adjacent the locks, the recess performs no useful purpose or function. The recess is at such areas primarily because the recess is desired at the relatively small areas where the locks are located. Moreover, from the appearance standpoint it is desirable that the luggage case be substantially smooth and uninterrupted in the central longitudinal area where the valance is located so that the continuity of the case's lines may be maintained.

A primary object of the invention is to provide a luggage case wherein the valance thereof furnishes a flat, smooth surface which is unbroken or uninterrupted by a recess or like depression, the valance having latching devices or latching and locking devices associated therewith so that the continuous contour lines of the luggage case are not disturbed or marred by their projection from the luggage case.

Another object of the invention is to provide a valance which is constructed to furnish a flat, smooth, linearly continuous exposed surface, but which is nevertheless made so that latching devices or locks may be assembled therewith in a manner permitting them to be protected by the valance with their bulk concealed beneath the visible portion of the valance.

A further object of the invention is to provide a latching device or latching and locking device which is so constructed that it may be mounted in flush or coextensive engagement with and suspended from a valance member, whereby the continuous contour lines of the luggage case are not disturbed or marred by the projection of the latching devices or locks for the luggage case.

Still another object of the invention is to provide a latching or latching and locking device which has its exposed portion lying in substantially the same flat, linear plane as the plane of the flat, smooth, exposed surface of the valance member with which the devices are associated, there being no parts of the latching or latching and locking devices which are outwardly projecting where they may become damaged because they extend beyond the normal contour of the luggage case or the valance serving to reinforce the edge or edges of the case's shells.

Still a further object of the invention is to provide a latching or latching and locking device which is constructed so that when assembled with a luggage case the operating parts thereof, except for a flat, non-protruding push button to unlatch, are located within the luggage case or on the underside of the visible portion of a valance member for the luggage case.

Still another object of the invention is to provide a latching and locking device which is greatly miniaturized as compared to known luggage lock structures.

Still another object of the invention is to provide a latching or latching and locking device which affords a truly flush relationship with respect to the valance with which it is assembled, and does not require resort to recessing as furnished by a valance structure as hereinbefore referred to, with the attendant loss of the desired continuous line character of the luggage case.

These, and other objects, advantages and improved results of the invention will be apparent from the detailed description, taken in conjunction with the drawings illustrating a preferred embodiment of the invention, in which.

Figure 1:
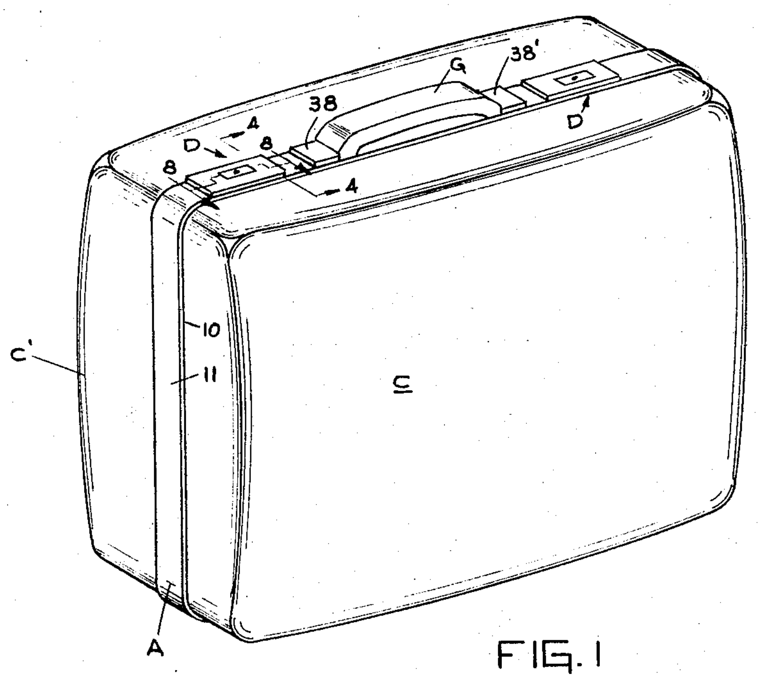
FIG. 1 is a perspective view of a luggage case made in accordance with the invention.

Referring to the drawings and more particularly to FIGS. 1–5, a luggage case made in accordance with the invention includes a valance member A which preferably is formed as an extrusion of a suitable aluminum alloy, whereby the portions of the valance member are integrally connected to one another as a single unitary piece. Although aluminum and an extrusion thereof is preferred, the valance member A may be made of other materials such as magnesium or steel, or it may be molded of a plastic material the composition of which is selected to furnish the desired measure of rigidity.

The valance member A comprises a longitudinally extending web 10, the outer surface 11 of which is exposed and visible when the valance member is assembled with a luggage case section. Functionally, the top or outer exposed surface of the valance member is linearly smooth, flat and uninterrupted by a recess, depression or the like. If desired, the top exposed surface 11 of the web 10 may be provided with lines, striations, or the like for decorative purposes. From the structural standpoint however, the web's top surface 11 lies in substantially the same plane as, or in a plane parallel to but only slightly above, the plane of the top surface of the case section C to which it is secured.

Figure 3:
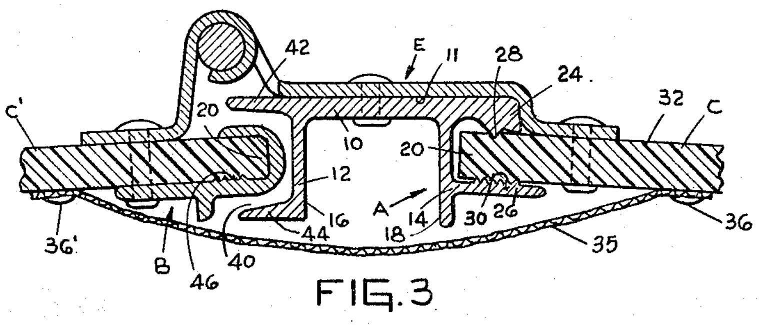
FIG. 3 is a cross-sectional view taken approximately in the plane of line 3—3 of FIG. 2.
Figure 4:
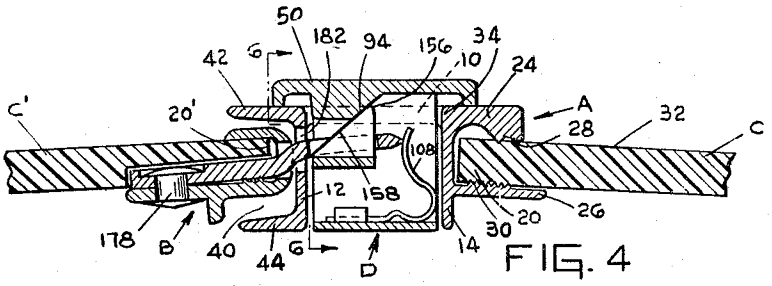
FIG. 4 is a vertical cross-sectional view taken approximately in the plane of line 4—4 of FIG. 1.
Figure 5:
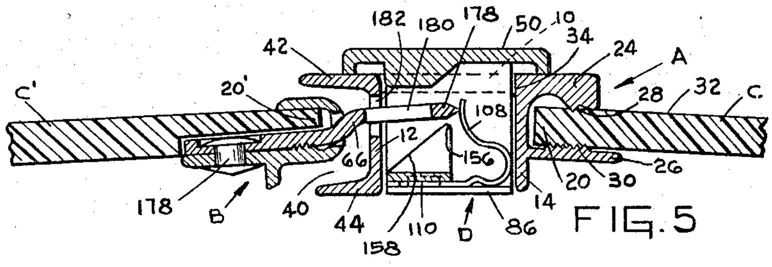
FIG. 5 is a view similar to FIG. 4, this view showing the relationship of the valance members and a latching device and hasp as the case sections are being unlatched from one another.

As best shown in FIGS. 3, 4 and 5, a pair of laterally spaced, vertically arranged, longitudinally extending flanges 12 and 14 extend from the underside of the web 10 to provide an internal channel. The inner opposed faces 16 and 18 of the flanges 12 and 14, respectively, are spaced from one another a distance slightly more than the width of the assembly of working parts of each of the latching or latching and locking devices D which are positioned between such faces as shown in FIGS. 4 and 5. Also, the height of the spaced flanges 12 and 14 is dimensionally selected so that the underside of each of the latching devices assembled with the valance member A is substantially in line with the lower extremities of the flanges. The extent that the latching and locking devices of the invention may be miniaturized will be evident from the fact that the distance between the faces 16 and 18 may be as little as 0.50 inch and the height of the flanges may be as small as 0.30 inch.

The valance member A preferably is provided with integral means for connecting it to the case section C constituting one of the usual pair of opposed concave case sections or shells. The second case section is designated C′ and the respective peripheral edges of the case sections are designated 20 and 20′. The peripheral edges are adapted to be positioned in substantial juxtaposition when the luggage case is in its closed or latched condition as shown in FIGS. 1, 3 and 4. The case sections may be of any suitable wear resistant material. They may be made by molding a suitable plastic material to furnish substantially rigid shells; they may be made of drawn aluminum or magnesium alloys, or they may be made of leather or leather-like material.

Figure 2:
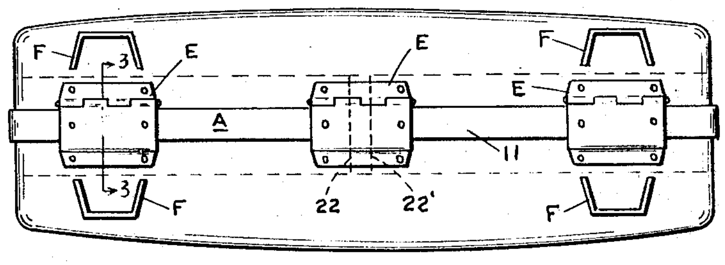
FIG. 2 is a view looking toward the bottom side of the luggage case shown in FIG. 1.

A continuous length of the valance member A is cut to a length substantially equal to the overall length of the peripheral edge 20 of the case section C and bent to conform to the contour of the peripheral edge. The free ends 22, 22′ of the valance member A are preferably located in juxtaposition on the bottom of the luggage case where the ends may be bridged or concealed by one of a plurality of hinges E as shown in FIG. 2. The hinges are of a construction which is well known in the art, and do not constitute part of the present invention. Also, the bottom walls of each of the sections are provided with usual bumpers or feet F.

The valance member A preferably is secured to the peripheral edge 20 of the case section C by providing the downwardly extending flange 18 with a pair of vertically spaced, laterally extending short flanges 24 and 26. The flange 24 lies in substantially the same plane as the top web 10, being in effect a lateral extension of the web. Initially, the lower flange 26 is vertically spaced from the upper flange 24 a distance slightly greater than the thickness of the wall of the case section C to allow the peripheral edge of the case section to be inserted between such flanges and butted up against the outer side of the downwardly depending flange 14. Preferably, and as illustrated, the flanges 24 and 26 are provided on their inner faces with longitudinally extending sharp edges or teeth 28 and 30, respectively, so that after the edge 20 of the case section is inserted between the flanges, the flange 26 may be bent upwardly into parallelism with the flange 24 whereupon the teeth 28 and 30 will bite into the material of the case section and furnish a strong connection of the valance member with the case section. This type of connection has been found to be particularly suitable where the valance member is an extruded aluminum alloy and the case section or shell is molded of a thermoplastic material such as polypropylene. If desired, and in order not to mar the appearance of the upper exposed face 11 of the valance member, rivets may be extended through the lower connecting flange 26 and through the wall of the shell C, the rivets being concealed by the overlying flange 24.

As best illustrated in FIGS. 1, 3, 4 and 5, when the valance member A is assembled with the case section C, the top exposed surface of the valance member constitutes a substantial linear continuation of the upper exposed surface of the adjoining case section, the surface 11 being but slightly higher than the adjoining surface 32 by the amount of the thickness of flange 24, which is only on the order of approximately 0.05″. There is no depression or exposed channel to mar the continuity of the case's contours at the central longitudinal area of the luggage case where the valance is located.

As shown in FIGS. 4 and 5, the web 10 and the spaced flanges 12 and 14 projecting therefrom provide an inner channel which on the top side of the luggage case is open in a downward direction toward the interior of the luggage case within which, as previously described, the latching devices D are protectively housed and concealed beneath the web 10. As will be subsequently described, each latching device D has a mounting plate and a push button exposed on the top of the luggage case; however, these elements of the latching devices do not mar the continuity of line of the luggage case. The mounting plate acts to suspend the latching device or lock from the valance member A where it is housed within the internal channel provided by the web 10 and the downwardly extending flanges 12 and 14. An opening or aperture 34 is provided to extend through the web 10 to allow the bulk of each lock to be positioned and concealed within the valance member. The mounting plate of each latching device or lock extends beyond each side of the aperture in flush engagement with the top surface 11 of the web 10.

The interiorly open channel provided by the valance member A is also present along the sides of the case and on the bottom side of the case. On the bottom side of the case the channel provided by the valance member is upwardly open or open toward the top of the luggage case. Although the small channel at the bottom of the case is not detrimental, it is preferred to provide a continuous surface along this central bottom area of the case. For this purpose a cover strip 35 of a suitable flexible material, such as textile fabric or thin plastic sheet is used to bridge or cover the valance. As shown in FIG. 3, the valance cover strip 35 is secured to the case sections C and C′, as by flat-headed rivets 36 and 36′.

It will be understood that a luggage case made with the valance of the invention is provided with a suitable handle G, the handle supports 38, 38′ of which are fastened to the web 10 of the valance member A. As shown in FIG. 1, the handle supports are selected of a form to furnish flat upper surfaces in order not to interfere with the otherwise continuous line effect provided by the valance member A and the exposed mounting plates and push buttons of the illustrated locks D. The handle and its supports do not constitute any part of the present invention.

In the illustrated and preferred form of the invention, the valance member A is formed to furnish a sidewardly open channel 40 on the side of the valance member which is opposite the side secured to the shell C. The channel is defined by the outer wall of the downwardly depending flange 12 and a pair of vertically spaced, parallel arranged, longitudinally extending short flanges 42 and 44. The flange 42 is a lateral extension of the web 10, and the flange 44 extends outwardly and substantially perpendicularly to the flange 12 at the lower end thereof. The top surface of the flange 42 is in the same plane and constitutes an extension of the flat, functionally smooth surface 11. The channel 40 is adapted to receive the peripheral edge 20′ of the opposing case section C′, or a valance member B which may be secured to such peripheral edge. Although the assembly of the valance member B with the case section C′ is preferred because of the reinforcement it imparts to the edge of the case section and for the finished appearance it furnishes, it is within the scope of the invention to omit the valance member B where the case sections are of a rigid material such as drawn aluminum, which permits the exposed edge thereof to be rolled or otherwise formed to eliminate any sharpness at the edge. The preferred form of valance member B is essentially the same as disclosed in my Patent Number 3,112,018, and it is preferably formed as an aluminum extrusion having the profile or configuration shown in FIGS. 3, 4 and 5. Also, where the shell C′ is molded of plastic material or is of a material which may be gripped by teeth formed in a metal valance member, it is preferred to provide an inner surface of the valance member B with longitudinally extending teeth 46 for the connection of the parts. The thickness of the flange 42 is only on the order of 0.050 inch so that when the case is closed the valance's top surface 11 is only slightly higher than the adjoining top surface of the shell C′, thereby maintaining the substantially continuous, unbroken contour lines of the luggage case.

The preferred form of latching device D, a pair of which are shown assembled with the valance member A, is illustrated in detail in FIGS. 6–13, 13A and 13B. It will be understood that in certain types of luggage, hat boxes for example, only one latching device or lock need be used. The illustrated form of latching device also includes means for locking the device in its latched condition.

A latching device made in accordance with the preferred form of the invention generally comprises a group of stationary elements and a group of movable or plunger elements. The group of stationary elements comprises a mounting or cover plate 50, a frame member 52, a stud member 54 and hasp ejector means 56. In view of the preferred form of hasp used (FIG. 14), the hasp ejector means is preferably in the form of a pair of longitudinally spaced spring members 56*a* and 56*b*. The plunger group comprises a plunger member 58, resilient means 60 for normally maintaining the plunger in latched or hasp-engaged position, hasp-engaging means 62 and means 64 cooperable with the stud 54 to allow the plunger to be moved from hasp-engaging to hasp-disengaging or unlatched position. The hasp-engaging means 62 of the latching device is cooperable with a hasp 66 shown in FIG. 14.

The latching and hasp-cooperable device D is also provided with means for releasably maintaining or locking the hasp-engaging means 62 in its latched position. For this purpose, the means 64, which is cooperable for telescoping relation with the stud 54 is made to also function as a locking bolt. As a locking bolt it is mounted for rotation about a vertical axis so that its linear movement into telescoping relationship with the stud 54 may be prevented. As a result, hasp engaging means 62 which is associated with the bolt 64 may be locked in hasp-engaging position to prevent the hasp from being separated from the latching device D. The bolt 64 is provided with means engageable by a key (not shown) so that the bolt may be rotated from its unlocked to locked position and vice versa. A ring member 67 is associated with the bolt 64 to support a key barrel 68 and to supply means for positively and releasably holding the bolt member 64 in its locked and unlocked positions. The ring member 67 also serves to confine the bolt between the plunger and its associated stationary part or stud member 54. Access to the key barrel 68 is provided by forming the plunger 58 with an opening 70 through which the key barrel is extended. For latching purposes only, the ring member 67 simply functions as a shim.

Figure 13B:
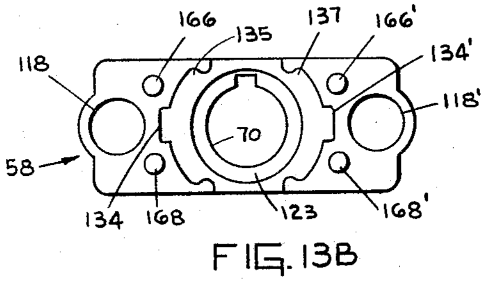
FIG. 13B is a bottom plan view of the plunger element of the device.
Figure 13A:
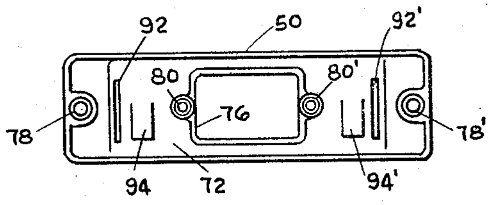
FIG. 13A is a bottom plan view of the mounting plate element of the latching device, the same being shown in the actual preferred dimensions thereof.
Figure 13:
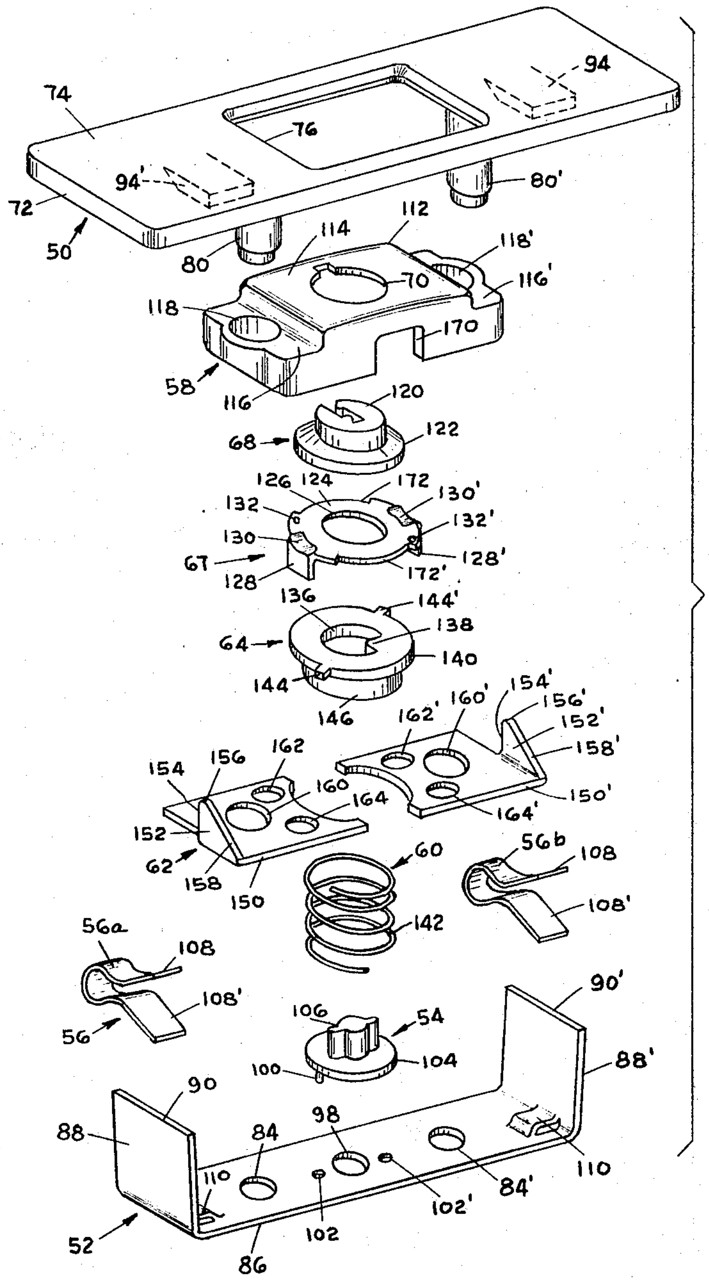
FIG. 13 is an exploded view showing in perspective the several components of a latching and locking device constituting the preferred embodiment of the invention.

In greater detail, and with reference to FIGS. 13 and 13A, the mounting plate 50 has a main body portion 72 in the form of a flat, substantially rectangular plate portion which provides a flat, smooth upper surface 74. A central aperture 76 extends through the plate portion. The width of the main body portion 72 is selected so that it does not exceed the overall width of the valance A. For example, with a valance having a width of 1.125 inch between the outer extremities of the flanges 24 and 42, the width of the body portion 72, may be as little as 0.78 inch. The miniaturized character of the lock will be evident from the fact that its greatest dimension lengthwise, or the length of the main body portion 72, may be as small as 2.76 inch.

Figure 6:
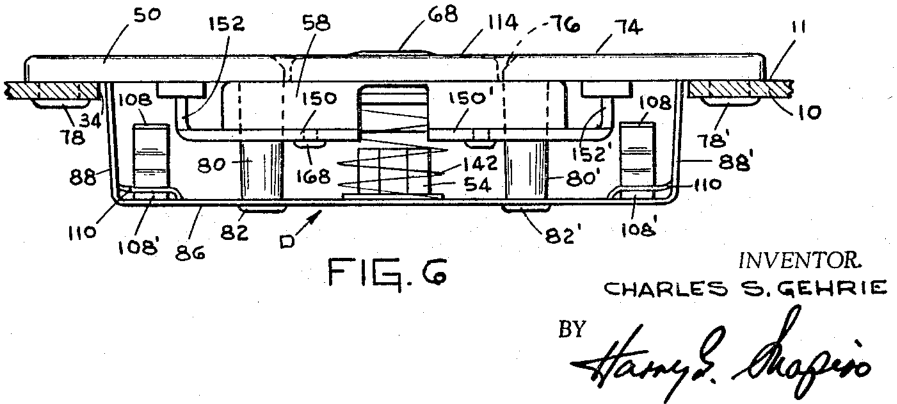
FIG. 6 is a side elevational view of the latching device looking in the direction of the line 6—6 of FIG. 4; this view showing the device in its latched condition and with the hasp omitted.
Figure 7:
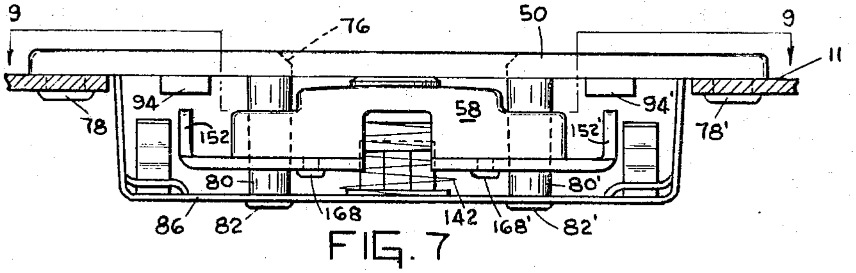
FIG. 7 is a view similar to FIG. 6, this view showing the latching device in its unlatched condition.

The mounting plate 50 is preferably formed as a die casting and has its outer surface 74 plated to provide a suitable bright finish. Although the main body portion may be provided with apertures to enable securing the mounting plate to the valance member A by rivets or the like, it is preferred that the smooth upper surface 74 be unmarred. Accordingly, and as shown in FIGS. 6, 7 and 13A, the mounting plate is provided on its underside with integrally formed connecting studs 78, 78′ near each end of the plate and along its central longitudinal axis. The connecting studs are cast with central depressions so that after being passed through aligned openings formed in the valance member A, a tool may be inserted into the depressions to swage the ends over to secure the mounting plate to the valance member. As shown in FIGS. 6 and 7, the mounting plate overlies and is in flush engagement with the top surface 11 of the valance member and provides a minimal thickness of material projecting above the valance member. The main body portion 72 has a thickness on the order of only 0.09 inch.

The mounting plate 50 preferably is provided with integrally formed means for connecting it to the frame member 52. For this purpose, the mounting plate is formed with a pair of longitudinally spaced, vertically arranged shanks 80, 80′ extending from the underside of the main body portion 72 and terminating in extremities 82, 82′ which may be passed through openings 84, 84′ extended through the base wall 86 of the frame member 52. The extremities of the shanks are formed similar to the extremities of the connecting studs 78, 78′ so that after they have been extended through the openings 84, 84′, the extremities may be swaged or peened over to secure the connection of the frame member to the mounting plate.

The frame member is formed to provide an opening at the side thereof facing the case section C' to allow passage of the hasp member 66 to the hasp-engaging means 62. Since the flanges 12 and 14 of the valance member A protect the sides of the latching device, the frame member may be entirely open to the sides and in the form of a U-shaped piece. The U-shaped frame member has a pair of opposite walls 88, 88', the free extremities of which 90, 90' are received in recesses 92, 92' (FIG. 14A) formed on the underside of the body portion 72 of the mounting plate. The mounting plate 50 and the frame member 52 as thus assembled constitute the envelope for the elements of the latching device or lock. The overall height of the envelope, between the underside of the mounting plate 50 and the base wall 86 of the frame member 52 may be on the order of less than 0.50 inch; the length of the envelope, or the distance between the walls 88' of the frame member may be on the order of 1.65 inch, and the width of the envelope may be on the order of only 0.48 inch.

The mounting plate 50 is also provided on its underside with longitudinally spaced stops 94, 94' having their exposed surfaces angled for complementary or mating engagement with the prongs or detent portions of the hasp-engaging means 62, as will be subsequently described.

Figure 8:
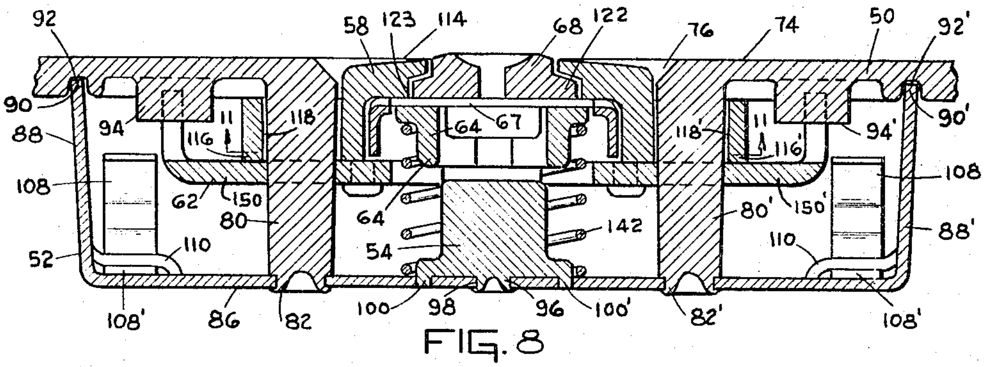
FIG. 8 is a vertical cross-sectional view taken approximately in the plane of line 8—8 of FIG. 1, this view showing the device in latched condition.

As best shown in FIG. 8, the stud member 54 is fixedly connected to the frame member 52 substantially midway of its length. The stud member which is preferably formed by die casting has a central connecting projection 96 at its lower side which is extended through an opening 98 formed in the bottom wall 86 of the frame member, and then swaged or peened over to prevent the separation of the parts. To prevent the stud member from rotating with respect to the frame member to which it is connected, the stud member also is provided at its lower end with a pair of diametrically opposed downwardly extending projections 100, 100' which are positioned within openings 102, 102' formed in the bottom wall 86 of the frame member (FIG. 13).

As shown in FIG. 13, the stud member 54 has an annular portion 104 intermediate its height from which there upwardly extends a protrusion 106 of a reduced diameter for mating cooperation and entry into a similarly shaped opening formed on the underside of the cooperating means or locking bolt 64. Although the protrusion 106, and the mating opening in the bolt 64 may be of any desired irregular contour to provide "go" and "no go" conditions, it is preferred that the contour of the protrusion and mating opening have the illustrated configuration because of its ease in die casting.

In addition to the mounting plate 50, the frame member 52 and the stud member 54, the stationary elements of the device include the hasp ejector means 56 which, as previously indicated, is preferably in the form of a pair of spring members **56*a* and 56*b* for cooperation with the illustrated form of hasp member 66. As shown in FIG. 13, the hasp ejector spring members are each a leaf spring bent into substantially U-shape with the arms 108, 108' of each member bent to converge toward one another intermediate their respective lengths and to then diverge. As illustrated in FIGS. 4–8, the spring members are mounted on the base wall 86 of the frame member in longitudinally spaced relationship with the arm 108' of each spring member captured between the frame wall 86 and a strap-like portion 110 which is struck up from the wall, as best shown in FIG. 13. The arms 108' are force fitted beneath the respective strap portions 110 to secure the ejector members in place. The divergence of the arms 108** facilitates the lead-in of the hasp and the desired stressing of the spring arms.

The plunger 58 of the vertically movable plunger group of elements is shown in FIGS. 13 and 13B. This element, which actuates the hasp-engaging means 62, also is preferably made by die casting. It has an upstanding boss portion 112 adapted to be received within the aperture 76 of the cover plate 50. The plunger member is plated to provide a finished appearance, particularly on the top surface 114 of the boss portion which is exposed and provides a push button. Shoulders 116, 116' extend to each side of the push button portion 112, each shoulder being provided with a vertically extending aperture 118, 118', respectively, through which extend the shanks 80, 80' acting to connect the mounting plate 50 with the frame member 52. Thus, the shanks have the additional function of providing a guide for the vertically movable plunger. The central aperture 70 extending through the boss portiong receives the slotted upstanding boss 120 of the key barrel 68. The key barrel has an annular flanged portion 122 at the bottom so that with the key barrel boss 120 postioned in the aperture 70, the key barrel cannot escape, but may rotate with respect to the plunger. As shown in FIGS. 8 and 13B, the underside of the plunger is formed or cast with a countersink 123 to receive the flanged portion 122 of the key barrel.

In the illustrated lock form of the invention, the ring member 67 is positioned on the underside of the key barrel to support the key barrel against the plunger. As shown in FIG. 13, the ring member comprises a generally annular disk portion 124 having a central aperture 126 to allow passage of the tang of a key to the locking bolt member 64. The ring member has a pair of short downwardly extending legs 128, 128' at diametrically opposite sides of the member. The disk portion is provided with a pair of diametrically opposed downwardly projecting protrusions or bumps 130, 130' at the intersection of the legs 126, 126' with the disk portion. Also, the disk portion is provided with diametrically opposed projections or bumps 132, 132' on the underface thereof, these projections being circumferentially offset with respect to the projections 130, 130'. The purposes and functions of the projections or bumps 130, 130' and 132, 132' will be subsequently explained. As best shown in FIG. 8, the ring member 67 is sandwiched between the key barrel on its top side and the locking bolt member 64 on its underside.

As shown in FIG. 13B, the underside of the plunger 58 is formed or cast with a cavity having an outline to receive the ring member 67. This cavity includes a pair of vertically extending recesses 134, 134' which receive the legs 128, 128' of the ring member to prevent the ring member's rotation with respect to the plunger member.

As shown in FIG. 13, the locking bolt 64 is an annular member having a central apetrure 136 at its upper end within which a detent 138 projects to provide shoulders for engagement by the tang of the key so that the locking bolt may be rotated about its vertical axis. The upper end of the bolt member is formed to provide an annular flange 140, the underside of which is adapted to be engaged by the end of a helically coiled compression spring 142 (FIG. 8). The flange 140 has a pair of laterally extending projections 144, 144' at diametrically opposite sides of the part for coaction with the overlying bumps 130, 130' and 132, 132' of the ring member 66.

As shown in FIGS. 9–13, the lower body portion 146 of the locking bolt member is provided with a central aperture of a different configuration than the aperture 136. This aperture, designated 148, has a mating configuration with the protuberance 106 on the stud member 54, the outline of the opening 148 being slightly greater than the outline of the protuberance 106.

The bumps 130, 130' function to center and guide the member 64 for rotation about its vertical axis. These bumps also act as a stop in any given position of the member if friction and the force of the spring would be overcome and tend to allow the member to rotate without the aid of the key. The bumps 132, 132' and the projections 144, 144' are positionally located with reference to the orientation of the opening 148 in the locking bolt member so that the member snaps in and is releasably held in its unlocked position (FIG. 11), which permits the plunger to be depressed and the device to be unlatched. In all other positions of the locking bolt member, the plunger is in a "no-go" condition.

As shown in FIG. 13, the hasp-engaging means 62 is preferably made in two parts in order to conserve space and to facilitate assembly. It will be understood, however, that the hasp-engaging means may be made as a single piece. As shown, each part of the hasp-engaging means (the second part has the elements thereof primed) comprises a flat, horizontally extending base portion 150 from which there projects in an upward direction a prong 152 located at the side and forward end thereof. The prongs are each formed with a vertically extending edge 154 terminating in a point 156 which is intersected by an edge 158 extending on a receding angle with respect to the base portion 150. The edges, 158, 158′ are on a complementary angle to the angled stops 94, 94′ on the underside of the mounting plate 50.

As also shown in FIG. 13, the base portion 150 of each hasp-engaging piece has three apertures; that is, an aperture 160 having a slightly larger diameter than the respective shanks 80, 80′ which are extended therethrough for guiding of the hasp-engaging means, and the transversely spaced apertures 162, 164 which serve as part of the means for connecting the hasp-engaging means to the plunger member 58. This is accomplished by providing the underside of the plunger member with pairs of downwardly extending integrally formed, longitudinally spaced connecting studs 166, 168 and 166′, 168′ (FIG. 13B). After the connecting studs are extended through the aligned openings 162, 164 and 162′, 164′ in the hasp-engaging members, the ends of the connecting studs are swaged or peened over to firmly connect the hasp-engaging means for movement with the plunger (FIGS. 6 and 7).

In order to minimize the width of the assembly, the plunger member 58 is provided at its front and rear sides with centrally located cutouts or openings 170, 170′ to allow minimal diameters for the ring and bolt members; also, the hasp-engaging means is made in two parts as described to minimize the width of the plunger assembly. In keeping with the purpose of miniaturization, the disk portion 124 of the ring member 67 is also provided with cutouts 172, 172′ along portions of its peripheral edge where the diameter may be reduced without interfering with the functions of the part.

FIGS. 6–12 illustrate the relationship of the assembled elements of the preferred form of luggage lock construction. The compression spring 142 at its lower end bears against the wall 86 of the frame member 52. The spring is of a diameter larger than the diameter of the stud member 54 to clear the same. The upper end of the compression spring bears against the flange 140 of the locking bolt member 64 thereby also urging the ring member positioned thereon, the plunger, and the hasp-engaging means connected to the plunger member in an upward direction so that the top surface 114 of the plunger member normally and in its uppermost position lies in the same plane as the top surface 72 of the mounting plate 50.

Figure 14:
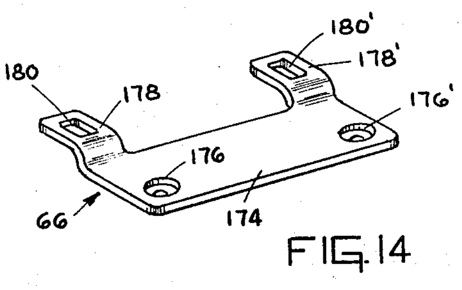
FIG. 14 is a perspective view of a hasp suitable for cooperation with the latching or latching and locking devices of the invention.

When a pair of locking devices D are assembled with the valance A as shown in FIG. 1, a pair of cooperating hasps 66 are assembled with the case section C′. As shown in FIG. 14, the hasp 66 comprises a flat plate portion 174 provided with longitudinally spaced apertures 176, 176′ through which rivets 178 may be extended to secure the hasp to the associated case section or, as illustrated in FIGS. 4 and 5, to the valance member B secured to the edge of the case section. The plate portion 174 may be countersunk at the apertured areas so that the heads of the rivets do not extend above the remainder of the plate portion. The plate portion is provided with a pair of longitudinally spaced extensions 178, 178′ which are apertured at 180, 180′ to receive the prongs 152, 152′ therethrough when the sections of the luggage case are closed and latched to one another. As also shown in FIGS. 4 and 5, the apertured extensions of the hasp are bent up out of the plane of the plate portion 174 so that they may pass through openings 182 formed in the downwardly extending flange 12 of the valance member A which faces the shell C′ and permit proper engagement with the spring arms 108 of the hasp ejector means.

FIGS. 4, 6 and 8 show the relationship of the elements of the latching device when in its latched condition, FIG. 4 also showing the cooperative relationship of the latching device with the hasp. In latched condition, the compression spring 142 bearing on the underside of the bolt member 64 urges the plunger 58 and its associated key barrel 68, ring member 67 and hasp-engaging means 62 to their uppermost position where the uppermost surface 114 of the plunger is in linear alignment with the top surface 72 of the mounting plate 50. In the latched position, the prongs 154 and 154′ extend through the apertures 180, 180′ of the hasp to latch together the case sections C and C′ as shown in FIG. 4. The edges 158, 158′ of the hasp-engaging means prongs engage and are stopped by the complementary angled surfaces 94, 94′ on the underside of the mounting plate 50.

Figure 9:
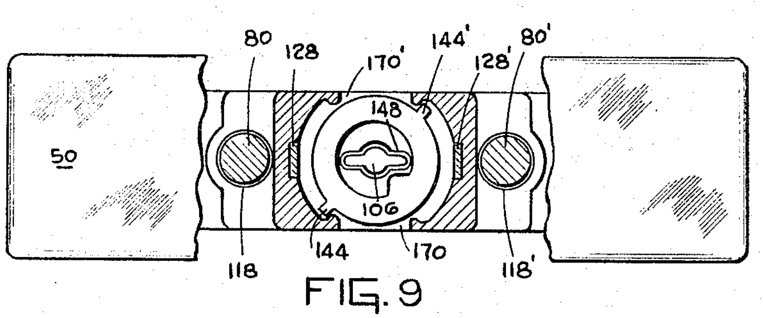
FIG. 9 is a horizontal elevational view, partly in cross-section, taken approximately in the plane of line 9—9 of FIG. 7.

To unlatch the device from the hasp, pressure is applied in a downward direction to the top surface or push button 114 provided by the plunger 58. In unlatching, the bolt member 64 has its opening 148 in alignment with the protuberances 106 of the stud member 54 as shown in FIG. 9. This allows a telescoping action to take place whereby the bolt member may move down over the protuberance of the stud member against the force of the spring 142. The telescoping relationship furnished by the bolt and stud members affords a minimal volume for the parts while permitting an extent of movement sufficient to cause the prongs of the hasp-engaging means to move out from within the apertures 180, 180′ of the hasp. As shown in FIG. 5, as soon as the tips 156, 156′ of the prongs of the hasp-engaging means are below the level of the extensions 178, 178′ of the hasp, then the arms 108 of the hasp-ejector springs engage the noses of the hasp extensions 178, 178′ to push the hasp and its associated case section C′ away from the section C to which the latching device is attached.

As also will be evident from FIG. 5, when the case is being closed, the hasp extensions engage the receding edges of the prongs to automatically cam the hasp-engaging means downwardly until the prongs enter the apertures 180, whereupon the prongs will automatically spring up and enter the hasp's apertures. Since the hasp-engaging means is associated to move together with the bolt 64, the ring member 67, the key barrel 68 and the plunger 58, this assembly of elements moves down together in the act of latching and moves up together when the device is latched to the hasp. The movement together of the hasp and the latching device also results in the spring arms 108 of the hasp-ejector means being stressed so that when pressure is applied to the push button provided by the plunger, as hereinbefore described, the ejector means serves to separate the case sections.

When latching or unlatching, the ring member 67 simply serves as a shim between the plunger on the top side thereof and the bolt member on its underside. Also, the bolt member simply serves as a part of the latching mechanism in the sense that it provides means for telescoping cooperation with the stationary stud member 54 to permit the hasp-engaging means to be moved from the position shown in FIGS. 4, 6 and 8 to the position shown in FIG. 7. The ring member and associated top portion of the belt member come into play and exercise their functions when it is desired to lock the device in its latched position.

Figure 10:
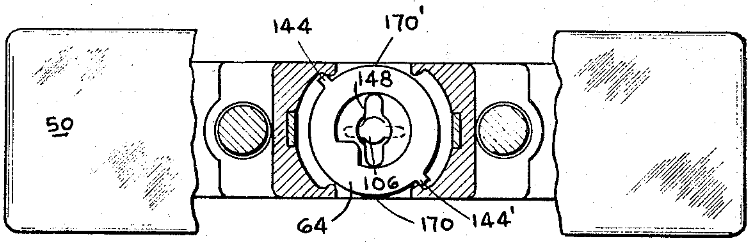
FIG. 10 is a view similar to FIG. 9, this view showing the latching device in locked condition as compared to the unlocked condition shown in FIG. 9.
Figure 11:
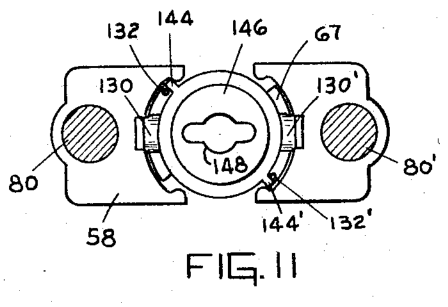
FIG. 11 is a horizontal cross-sectional view taken approximately in the plane of line 11—11 of FIG. 8.
Figure 12:
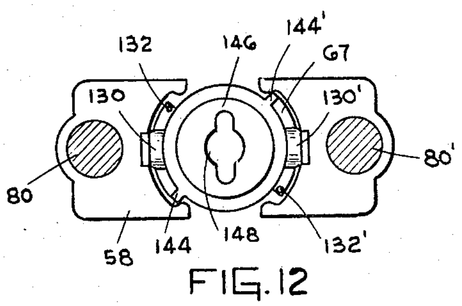
FIG. 12 is a view similar to FIG. 11, this view however showing the relationship of the parts when the latching and locking device is in its locked condition.

For such purpose, and with the device in the latched condition as shown in FIGS. 4, 6 and 8, the bolt member 64 is rotated to a "no go" condition to prevent the plunger and its associated parts from being moved or depressed from its latched condition. This is accomplished when a key is inserted through the slot in the key barrel, has a tang thereof in engagement with a shoulder provided by the detent 138, and is rotated. As a result, the bolt member 64 is rotated about its vertical axis so that its opening 148 is turned from alignment with the protuberance 106 of the stud member (FIG. 9) to a position of misalignment (FIG. 10). With such relationship of locking bolt and stud members, and with the prongs 152, 152' extended through the apertures 180, 180' of the hasp, the latching device is locked to the hasp. The locking bolt member is in the position which locks the latching device in latched condition when the locking bolt member is rotated to the position shown in FIGS. 10 and 12. When the locking bolt member is rotated back by the key to the position where its aperture 148 is in alignment with the protuberance 106 as shown in FIGS. 9 and 11, the device is unlocked and it may then be unlatched by simply pressing down on the push button provided by the plunger.

It is believed that the advantages and improved results afforded by the luggage of the invention, including the novel valance member, and latching or latching and locking device of the invention, will be apparent from the foregoing detailed description of a preferred embodiment of the invention. It will be understood that various changes and modifications may be made without departing from the spirit and the scope of the invention as sought to be defined in the following claims:

I claim:

1. In a luggage case formed of a pair of opposed concave sections having peripheral edges adapted to be positioned in substantial juxtaposition when the case is closed, the combination of a valance member secured to the peripheral edge of one of the case sections and a latching device associated with the valance member to releasably secure the case sections to one another, said valance member being integrally formed and comprising a longitudinally extending web the top exposed surface of which lies in substantially the same plane as the plane of the top surface of the case section to which it is secured, a pair of laterally spaced, longitudinally extending flanges extending from the underside of said web providing an internal channel, said latching device comprising a flat mounting plate overlying and in flush engagement with the top surface of said web, said mounting plate having an aperture extending therethrough, a frame member suspended from said mounting plate extending through an aperture formed in said web and positioned in said internal channel, hasp-engaging means intermediate the mounting plate and the frame member, and a resiliently mounted plunger for actuating the hasp-engaging means, said plunger having a push button portion positioned in said mounting plate aperture, the top surface of the push button portion normally lying in substantially the same plane as the top surface of said mounting plate.

2. In a luggage case formed of a pair of opposed concave sections having peripheral edges adapted to be positioned in substantial juxtaposition when the case is closed, the combination of a valance member secured to the peripheral edge of one of the case sections and a latching device associated with the valance member, the opposite case section having a hasp member secured thereto for cooperation with the latching device whereby the case sections may be releasably secured to one another, said valance member being integrally formed and comprising a longitudinally extending web the top exposed surface of which lies in substantially the same plane as the plane of the top surface of the case section to which it is secured, a pair of laterally spaced, longitudinally extending flanges extending from the underside of said web providing an internal channel, the flange facing the opposite case section having an opening therethrough to allow passage of the hasp-member, said latching device comprising a flat mounting plate overlying and in flush engagement with the top surface of said web, said mounting plate having an aperture extending therethrough, a frame member suspended from said mounting plate extending through an aperture formed in said web and positioned in said internal channel, said frame member being formed to provide an opening at the side thereof facing the opposite case section to allow passage of the hasp member, hasp-engaging means intermediate the mounting plate and the frame member, and a resiliently mounted plunger for actuating the hasp-engaging means, said plunger having a push button portion positioned in said mounting plate aperture, the top surface of the push button portion normally lying in substantially the same plane as the top surface of said mounting plate.

3. In a luggage case as set forth in claim 2, wherein the flange facing the opposite case section is provided with a pair of vertically spaced, laterally extending flanges forming a first sidewardly open channel to receive the periphery of the opposite case section, the top flange being a lateral extension of the web and having its top surface lying in substantially the same plane as the top surface of the web; and wherein the second flange for the internal channel is provided with a pair of vertically spaced, laterally extending flanges forming a second sidewardly open channel in which the periphery of the case section secured to the valance member is received, the top flange being a lateral extension of the web and having its top surface lying in substantially the same plane as the top surface of the web.

4. In a luggage case as set forth in claim 3, wherein the case sections are each made of molded plastic material and the valance member is made of metal; and wherein at least one of the vertically spaced, laterally extending flanges for the case section to which the valance member is secured is provided with teeth on the inner surface thereof for the connection of the valance member and case section.

5. In a luggage case as set forth in claim 3 wherein the case sections are each made of molded plastic material and the valance member is made of metal; wherein at least one of the vertically spaced, laterally extending flanges for the case section to which the valance member is secured is provided with teeth on the inner surface thereof for the connection of the valance member and case section; and wherein the opposite case section has a metal valance member secured to the peripheral edge thereof receivable in said first sidewardly open channel, said valance member also being formed with internal teeth for connection to its case section.

6. In a luggage case formed of a pair of opposed concave sections having peripheral edges adapted to be positioned in substantial juxtaposition when the case is closed, the combination of a valance member secured to the peripheral edge of one of the case sections and a latching device associated with the valance member to releasably secure the case sections to one another, said valance member being integrally formed and comprising a longitudinally extending web the top exposed surface of which lies in substantially the same plane as the plane of the top surface of the case section to which it is secured, a pair of laterally spaced, longitudinally extending flanges extending from the underside of said web providing an internal channel, said latching device comprising a flat mounting plate overlying and in flush engagement with the top surface of said web, said mounting plate having an aperture extending therethrough, a frame member suspended from said mounting plate extending through an aperture formed in said web and positioned in said internal channel, hasp-engaging means intermediate the mounting plate and the frame member, a resiliently mounted plunger for actuating the hasp-engaging means, said plunger having a push button portion positioned in said mounting plate aperture, the top surface of the push button portion normally lying in substantially the same plane as the top surface of said mounting plate, a stud member having an upstanding protuberance secured to the frame member, and means movable with the plunger for telescoping cooperation with said protuberance to allow movement of the plunger and the hasp-engaging means to hasp-disengaging position.

7. In a luggage case as set forth in claim 6, wherein the means movable with the plunger for telescoping cooperation with said protuberance comprises a locking bolt member engageable by a key, said member being mounted for rotation to a position to prevent its telescoping cooperation with said stud member whereby the plunger cannot be moved and the hasp-engaging means is held in hasp-engaging position; and wherein the plunger is provided with an aperture, a key barrel intermediate the locking bolt member and the plunger, a portion of the key barrel being positioned in said plunger aperture.

8. A valance member for a luggage case formed of a pair of opposed concave case sections having peripheral edges adapted to be positioned in substantial juxtaposition when the case is closed and releasably secured to one another by a latching device, said valance member being integrally formed and having a length and curvature to complement the peripheral edge of a case section, said valance member comprising a longitudinally extending web, the top exposed surface of said web being adapted to lie in substantially the same plane as the plane of the top surface of the case section to which it is to be secured, a pair of laterally spaced, longitudinally extending flanges coextensive with and extending from the underside of said web providing an internal channel for the positioning therein of a latching device, one of the flanges being adapted to face an opposite case section, an aperture in the web to allow a latching device to be extended therethrough for positioning within said internal channel, and an aperture formed in the said flange adapted to face the opposite case section to allow passage of a hasp member for cooperation with a latching device.

9. A valance member as set forth in claim 8, wherein the flange opposite the flange to face the opposite case section is provided with a pair of vertically spaced, laterally extending flanges forming a sidewardly open channel to receive the periphery of the case section to be secured to the valance member, the top flange being a lateral extension of the web and having its top surface lying in substantially the same plane as the top surface of the web.

10. A valance member as set forth in claim 8, wherein the flange to face the opposite case section is provided with a pair of vertically spaced, longitudinally extending flanges forming a sidewardly open channel to receive the periphery of an opposite case section, the top flange being a lateral extension of the web and having its top surface lying in substantially the same plane as the top surface of the web; wherein the second flange for the internal channel is provided with a pair of vertically spaced, laterally extending flanges forming a sidewardly open channel to receive the periphery of the case section to be secured to the valance member, the top flange being a lateral extension of the web and having its top surface lying in substantially the same plane as the top surface of the web; and wherein at least one of the latter flanges is provided with teeth on the inner surface thereof for the connection of the valance member to a case section.

11. A latching device for luggage cooperable with a hasp member, said latching device comprising a flat mounting plate having an aperture extending therethrough, a frame member suspended from said mounting plate, hasp-engaging means intermediate the mounting plate and the frame member, a resiliently mounted plunger for actuating the hasp-engaging means, said plunger having a push button portion positioned in said mounting plate aperture, the top surface of the push button portion normally lying in substantially the same plane as the top surface of said mounting plate, a stud member having an upstanding protuberance secured to the frame member, and means movable with the plunger and formed for telescoping cooperation with said protuberance to allow movement of the plunger and the hasp-engaging means to hasp-disengaging position.

12. A latching device for luggage as set forth in claim 11, wherein the frame member has resilient hasp-ejector means mounted thereon.

13. A latching device for luggage cooperable with a hasp member, said latching device comprising a flat mounting plate having an aperture extending therethrough, a frame member suspended from said mounting plate, hasp-engaging means intermediate the mounting plate and the frame member, a resiliently mounted plunger for actuating the hasp-engaging means, said plunger having a push button portion positioned in said mounting plate aperture, the top surface of the push button portion normally lying in substantially the same plane as the top surface of said mounting plate, an aperture extending through the plunger, a stud member having an upstanding protuberance secured to the frame member, means movable with the plunger and formed for telescoping cooperation with said protuberance to allow movement of the plunger and the hasp-engaging means to hasp-disengaging position, said means comprising a locking bolt member engageable by a key, said member being mounted for rotation to a position to prevent its telescoping cooperation with said protuberance whereby the plunger cannot be moved and the hasp-engaging means is held in hasp-engaging position, and a key barrel intermediate the locking bolt member and the plunger having a portion thereof positioned in said plunger aperture.

14. A latching device for luggage cooperable with a hasp member as set forth in claim 13, wherein the frame member has a pair of spaced hasp-ejector members mounted thereon, each member comprising a substantially U-shaped leaf spring one strip of which is connected to the frame member, the other arm being adapted to be engaged and stressed by a hasp member.

15. A latching device for luggage cooperable with a hasp member, said latching device comprising a flat mounting plate having an aperture extending therethrough, a pair of spaced vertically arranged shanks extending from the underside of the mounting plate, a substantially U-shaped frame member having its base portion connected to the ends of said shanks and its arm portions in engagement with the underside of said mounting plate, hasp-engaging means intermediate the mounting plate and the frame member guided for vertical movement by said shanks, a plunger connected to said hasp-engaging means guided for movement by said shanks, said plunger having a push button portion positioned in said mounting plate aperture, the top surface of the push button portion normally lying in substantially the same plane as the top surface of said mounting plate, a stud member having an upstanding protuberance fixedly secured to the base portion of said frame member, means mounted for movement with the plunger and formed for mating telescoping cooperation with said protuberance to allow movement of the plunger and the hasp-engaging means to hasp-disengaging position; a coiled compression spring intermeddiate said means and said base portion of the frame member and a pair of spaced hasp-ejector members each comprising a substantially U-shaped leaf spring one arm of which is connected to said base portion of the frame member, the other arm being adapted to be engaged and stressed by a hasp member.

16. A latching device for luggage cooperable with a hasp member as set forth in claim 15, wherein the hasp-engaging means comprises a pair of plate members each formed with an upstanding prong having a forward edge inclined on a receding angle whereby the pressure of a hasp member against said edges causes the prongs to be cammed downwardly and the hasp member to be automatically latched to the latching device.

17. A latching device for luggage cooperable with a hasp member as set forth in claim 15, wherein the means mounted for movement with the plunger and formed for telescoping cooperation with said protuberance comprises a locking bolt member engageable by a key, said member being mounted for rotation to a position to prevent its mating telescoping cooperation with said protuberance whereby the plunger cannot be moved and the hasp-engaging means is held in hasp-engaging position.

18. A latching device for luggage cooperable with a hasp member as set forth in claim 15, wherein the means mounted for movement with the plunger and formed for telescoping cooperation with said protuberance comprises a locking bolt member engageable by a key, said member being mounted for rotation to a position to prevent its mating telescoping cooperation with said protuberance whereby the plunger cannot be moved and the hasp-engaging means is held in hasp-engaging position; wherein a ring member is positioned on the locking bolt member and fixed against rotation by cooperating means provided by the ring member and the plunger, said locking bolt member and ring member having cooperable means for releasably maintaining the locking bolt member in its respective locking and unlocked positions; wherein a key barrel is positioned intermediate the ring member and the plunger, said push button portion of the plunger having an aperture extending therethrough, and said key barrel having a portion thereof positioned in said aperture.

19. A latching device for luggage cooperable with a hasp member as set forth in claim 15, wherein the mounting plate is provided with integral, spaced connecting studs extending from the underside thereof for connecting the mounting plate to a luggage case section.

20. A latching device for luggage cooperable with a hasp member as set forth in claim 15, wherein the hasp-engaging means comprises a pair of plate members each formed with an upstanding prong having a forward edge inclined on a receding angle whereby the pressure of a hasp member against said edges causes the prongs to be cammed downwardly and the hasp member to be automatically latched to the latching device; wherein the means mounted for movement with the plunger and formed for telescoping cooperation with said protuberance comprises a locking bolt member engageable by a key, said member being mounted for rotation to a position to prevent its telescoping cooperation with said protuberance whereby the plunger cannot be moved and the hasp-engaging means is held in hasp-engaging position; wherein a ring member is positioned on the locking bolt member and fixed against rotation by cooperating means provided by the ring member and the plunger, said locking bolt member and ring member having cooperable means for releasably maintaining the locking bolt member in its respectively locked and unlocked positions; wherein a key barrel is positioned intermediate the ring member and the plunger, said push button portion of the plunger having an aperture extending therethrough, and said key barrel having a portion thereof positioned in said aperture; and wherein the mounting plate is provided with integral, spaced connecting studs extending from the underside thereof for connecting the mounting plate to a luggage case section.

References Cited by the Examiner

UNITED STATES PATENTS

| | | | |
|---|---|---|---|
| 2,426,764 | 9/1947 | Thiele | 70—70 |
| 3,125,874 | 3/1964 | Gehrie | 70—75 |
| 3,128,855 | 4/1964 | Hoffman | 190—49 |

GEORGE O. RALSTON, *Primary Examiner.*

JOSEPH R. LECLAIR, *Examiner.*

D. F. NORTON, *Assistant Examiner.*